United States Patent [19]

Buzzi

[11] Patent Number: 4,667,700

[45] Date of Patent: May 26, 1987

[54] APPARATUS FOR THROTTLING FLOW LIMITATION IN WATER FITTINGS

[75] Inventor: Guenter Buzzi, Schiltach, Fed. Rep. of Germany

[73] Assignee: Hans Grohe GmbH & Co., Fed. Rep. of Germany

[21] Appl. No.: 799,417

[22] Filed: Nov. 19, 1985

[30] Foreign Application Priority Data

Nov. 22, 1984 [DE] Fed. Rep. of Germany ....... 3442495

[51] Int. Cl.[4] .............................................. F16K 15/14
[52] U.S. Cl. ...................................... 138/45; 137/517; 239/533.1
[58] Field of Search ............................ 138/45, 40, 44; 137/517; 239/533.1

[56] References Cited

U.S. PATENT DOCUMENTS

| | | | |
|---|---|---|---|
| 2,409,294 | 10/1946 | Martin | 138/44 |
| 2,593,315 | 4/1952 | Kraft | 138/45 |
| 2,728,355 | 12/1955 | Dahl | 138/45 |
| 2,775,984 | 1/1957 | Dahl | 138/45 |
| 2,878,836 | 3/1959 | Binks | 138/45 |
| 2,936,788 | 5/1960 | Dahl et al. | 138/45 |
| 2,960,109 | 11/1960 | Wilson | 137/517 |
| 3,586,040 | 6/1971 | Urbeck | 137/517 |
| 3,642,031 | 2/1972 | Wright | 138/45 |
| 4,054,157 | 10/1977 | Mosely, Jr. | 138/40 |
| 4,105,050 | 8/1978 | Hendrickson et al. | 138/45 |
| 4,161,165 | 7/1979 | Merritt | 138/45 |
| 4,221,335 | 9/1980 | Shames et al. | 138/45 |
| 4,449,669 | 5/1984 | Mehoudar | 138/45 |

FOREIGN PATENT DOCUMENTS

| | | | |
|---|---|---|---|
| 1990117 | 7/1968 | Fed. Rep. of Germany . | |
| 1650209 | 9/1970 | Fed. Rep. of Germany . | |
| 2460002 | 2/1981 | France | 138/45 |

Primary Examiner—Stephen Marcus
Assistant Examiner—Leo Peters
Attorney, Agent, or Firm—Steele, Gould & Fried

[57] ABSTRACT

This apparatus is particularly suitable for sanitary fittings. It has a throttling insert (1) made from an elastic material and which bears against an annular shoulder (7). This throttling insert (1) is provided with a central flow opening (2) and is symmetrical to a plane normal to the flowpath. The flow opening (2) is provided with an annular regulating lip (5) on both the inflow and the outflow sides, the inflow side regulating lip increasing or decreasing the entry cross-section of the flow opening (2) as a function of the particular pressure of the water flowing through.

19 Claims, 6 Drawing Figures

APPARATUS FOR THROTTLING FLOW LIMITATION IN WATER FITTINGS

BACKGROUND OF THE INVENTION

The present invention relates to an apparatus for the throttling or restricting of flow in water fittings, particularly sanitary fittings, with a throttling insert made from an elastic material and supported against an annular shoulder having a flow opening, which is bounded on the inflow side by a regulating lip, which increases or decreases in size the entry cross-section of the flow opening as a function of the pressure of the water flowing through. Such an apparatus is described in Offenlegungsschrift 1650209, dated Sept. 10, 1970.

In the hitherto known means of this type, particularly in the higher delivery pressure range, disproportional regulating lip deformations occur. In addition, they are difficult to fit or are too noisy in operation.

The problem of the present invention is to improve an apparatus of the aforementioned type in that also in the higher delivery pressure range the flow through a pipe is uniformly throttled or restricted and problem-free fitting and replacement are possible. Moreover, there is to be a relatively large regulating opening, which cannot be clogged by small dirt particles carried along in the water.

This problem is solved by an apparatus of the aforementioned type, in which the throttling insert is constructed symmetrically to a plane passing perpendicularly to a flow limitation and which is provided on both the inflow side and the outflow side with an annular regulating lip. A throttling insert constructed in this way also offers the advantage that as a result of its symmetrical construction, it cannot be incorrectly fitted. Tests have shown that such a throttling insert can also be constructed so as to operate quietly. In addition, the symmetrically designed regulating lips on either side act asymmetrically in operation.

Throttling inserts having a flow channel increasing diameter along the flow path leading to a midpoint and a decreasing diameter past the midpoint, in the unloaded state, the diameter preferably varying continuously, are advantageous. Among these particularly those in which the inner wall of the flow channel is constructed in curved manner in longitudinal section and in preferably arcuately curved, so that a convex or cylindrical passage is obtained, which is bounded at its two openings by the regulating lips, have proved particularly advantageous because they operate quietly and adaptably.

According to a preferred embodiment, the throttling insert is substantially annular and is provided on either end face with an annular slot concentric to the flow channel. Parts of the annular slot wall form the outer wall of the inflow side and/or outflow side regulating lip, the areas of the throttling insert forming the transitions from the annular slots to the flow channel preferably having a cross section essentially corresponding to that of a wedge with a wedge angle of 35° to 50°. The smaller angle, i.e. the lower limit range is suitable for large bores and large throughflows, whereas the smaller wedge angles are intended for narrow flow bores with correspondingly smaller flow quantities. Wedge angles of 35° to 40° permit a relatively large constriction of the flow channel, because the regulating lip can be more strongly wrapped round.

The outside of the regulating lips is preferably constructed so as to correspond to the circumferential surface of a truncated cone, whose axis of symmetry runs in the through-flow direction. This truncated cone preferably extends into the bottom of the particular annular slot.

The side of the regulating lips facing the flow is preferably inclined out of the cross-sectional plane counter to the inflow direction by approximately 20° to 40° and preferably 30°, so that quiet throttling is possible, which reacts rapidly to pressure fluctuations. By variation wedge angles and slopes can be so matched to one another that desired characteristics of the throttling action are achieved.

According to a preferred embodiment a thrust ring is associated with the throttling insert and supports the insert radially and axially on the outflow side. This thurst ring can have a bearing shoulder which is essentially adapted to and projects into the outflow side slot profiling of the throttling insert. The thrust ring is preferably constructed in such a way that its bearing shoulder substantially leaves the wedge-shaped part of the outflow side regulating lip unsupported in the state when there is no through-flow. For calming the flow and for soundproofing purposes, the thrust ring can be provided on the outflow side with at least one flow guidance member, which is preferably constructed in one piece therewith. In a preferred embodiment, said flow guidance member is a perforated base plate.

The throttling unit can form together with the thrust ring associated therewith a unit which can be iserted and e.g. slid into a fitting and as such can be easily replaced even by the amateur without the aid of any tools. It is also possible to provide a plurality of throttling inserts having different throttling actions and whose boundary coming to rest on the thrust ring is always the same, so that they can be chosen as a function of the given pressure and flow conditions and can be interchangeably inserted in the thrust ring. The outer faces of the regulating lips form with the circumferential surface of the throttling insert an angle of preferably 50° to 80°.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
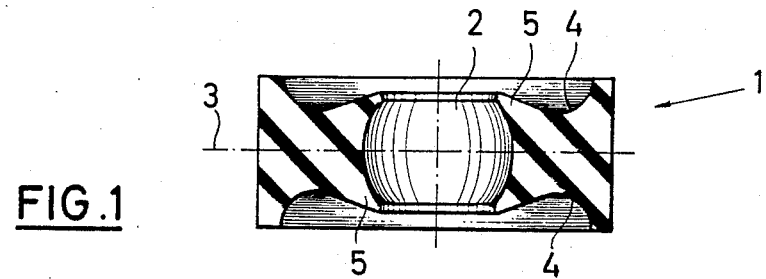
FIG. 1 A sectional side view of a throttling insert.

The throttling insert 1 made from an elastomeric material shown in the sectional side view of FIG. 1 has a central opening forming a flow channel 2 and is essentially annular and symmetrical to a plane 3 which is normal to the flow channel. On its two end faces, throttling insert 1 has in each case an annular slot 4 concentric to the flow channel 2. The wall of the flow channel 2 of throttling insert 1 is curved in an arcuate manner in the embodiment of FIG. 1, so that the internal diameter of the cylindrical flow channel 2 increases continuously along the flow path leading from the outside toward plane 3 on both the inlet side and the outlet side, respectively. The transitions from the frontal annular slots 4 to the flow channel 2 in each case form regulating lips 5, which have a substantially wedge-like cross-section. Their wedge angle is preferably between 35° and 50°. As can be clearly gathered from FIG. 1, the outsides of the two regulating lips 5 are in each case constructed corresponding to the circumferential surface of a truncted cone, which extends to the bottom of the particular annular slot 4. Throttling insert 1 is also constructed in an axially symmetrical manner. Its axial height compared with the external diameter is small and is approximately ¼ to ⅔, preferably ⅓ to ½ of the external diameter and is in particular of the same order of magnitude as the diameter of flow channel 2. Preferably the outer edges of slots 4 axially project farther than regulating lips 5.

Figure 2:
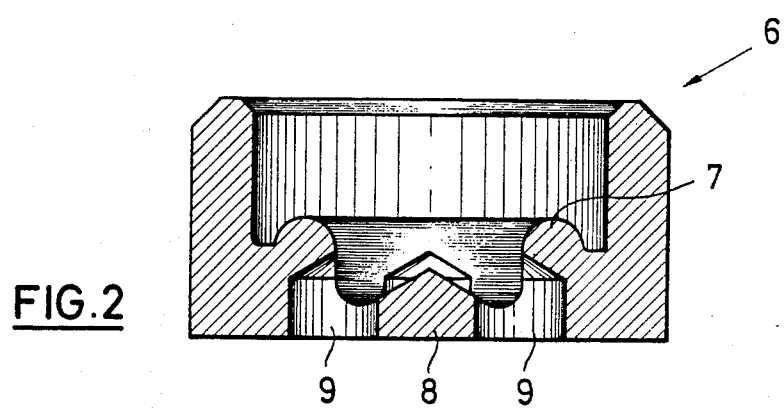
FIG. 2 A sectional side view of a thrust ring associated with the throttling insert according to FIG. 1.
Figure 3:
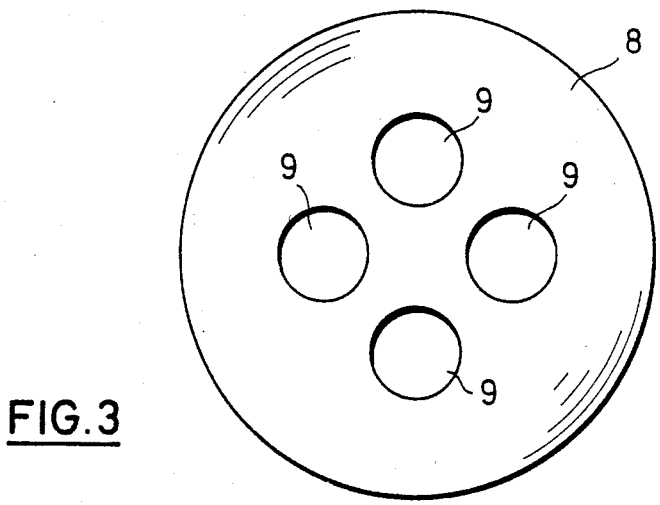
FIG. 3 An outflow side view of the thrust ring shown in FIG. 2.

With the throttling insert 1 shown in sectional side view in FIG. 1 is associated a thrust ring 6, which is shown in sectional side view in FIG. 2.

Figure 4:
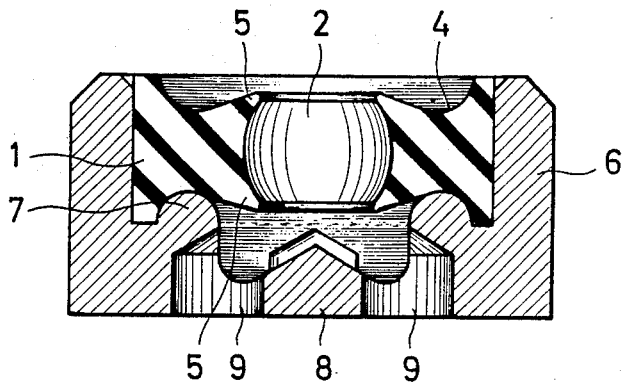
FIG. 4 A sectional side view of the throttling insert shown in FIG. 1 and the thrust ring surrounding it.

This thrust ring 6 is so dimensioned and constructed that it supports the throttling insert 1 axially on the outflow side and preferably radially. It has a bearing shoulder 7, which is essentially adapted to the outflow side annular slot 4 of throttling insert 1 and projects into the latter if insert 1 is inserted in the thrust ring 6 (cf. FIG. 4). The bearing shoulder 7 is dimensioned and constructed in such a way that it leaves the wedge-shaped part of the outflow side regulating lip 5 substantially unsupported in the state when there is no throughflow.

Figure 5:
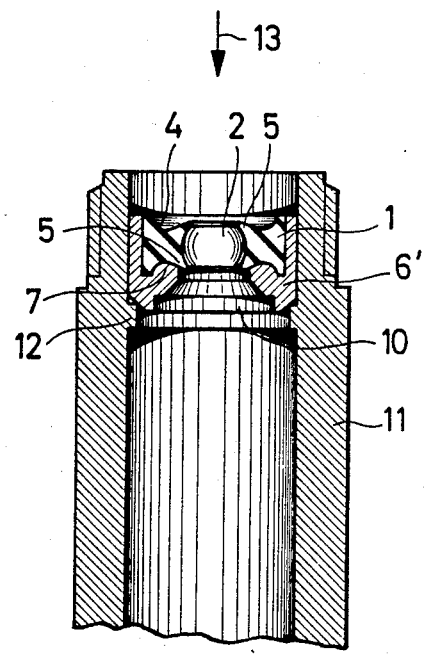
FIG. 5 The inflow side part of a water fitting, in which is inserted a throttling insert supported radially and on the outflow side by a thurst ring, in each case in sectional side view.

On the outflow side, thrust ring 6 is provided with a flow guidance member 8, which in the represented embodiment is formed by a base plate provided with four holes 9, whose center is closed and which divides the water flow from the throttling insert with a wedge-shaped or conical projection. The flow guidance member leads to an additional calming of the water flow and also serves to bring about an appropriate incident flow to downstream jet forming elements, e.g. aerators. The thurst ring 6' shown in FIG. 5 has no such flow guidance member. Instead thrust ring 6' is provided on the outflow side with a central flow opening 10 widening in three steps.

Thrust ring 6 or 6' forms with the throttling insert 1 placed therein a compact unit, which can easily be fitted in the inflow side end of a water fitting, e.g. the grip or handle of a shower head or sprinkler (cf. FIG. 5) until it engages on an annular shoulder 12 provided therein. The water fitting can then be connected to a water supply line, e.g. a pipe or hose. When this has taken place water can be supplied in a flowpath shown by the direction of arrow 13 to water fitting 11. In the case of a low water pressure, the throttling insert 1 forms an obstacle, whose throttling action is comparable with that of a perforated disk. If the water pressure increases, the inflow side regulating tip 5 of the throttling insert 1 is drawn inwards under the pressure of the through-flowing water, i.e. it is deformed in such a way that it reduces the entry cross-section of flow channel 2 to a greater or lesser extent, i.e. as a function of the particular water pressure. The outflow side regulating lip 5 of the throttling insert 1 is curved to a greater or lesser extent outwards in the case of an increasing water pressure and forms an elastic soft boundary, so that the water leaving throttling insert 1 can expand without leading to a lot of noise.

Figure 6:
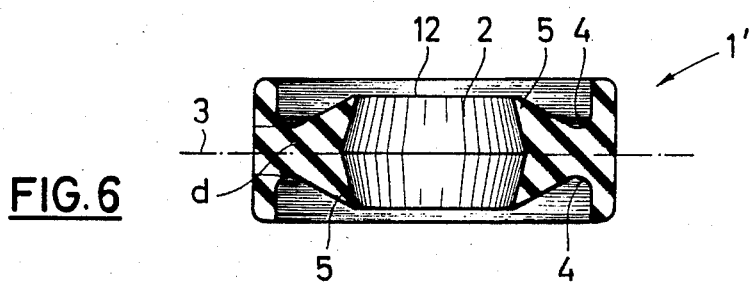
FIG. 6 A sectional side view of a throttling insert in a modified embodiment compared with the insert of FIG. 1.

The sectional side view of FIG. 6 shows a throttling insert 1' designed for a flow quantity of 2.75 gal/min and differs from the throttling insert 1 of FIG. 1 in that in this case the wall of flow channel 2 is not curved in longitudinal section, but instead varies linearly to define conical flow channel shapes in opposite directions along the flow path.

In the embodiment according to FIG. 1 the inflow and outflow ports of the flow channel 2 are cylindrically chamfered, i.e. the apex of the cross-sectionally wedge-shaped regulating lips 5 is cut off, accompanied by the formation of a cylindrical inner face. In the embodiment of FIG. 6, the inflow and outflow ports of flow channel 2 are in each case bounded by an edge 12, which is formed by the particular apex line. In the embodiment according to FIG. 6, the lip root d is thinner, so that the mobility of the regulating lips 5 is increased.

What is claimed is:

1. An apparatus for throttling flow in water fittings comprising:
 a throttling insert made from an elastic material and which bears against an annular shoulder, the insert having a flow opening to a flow channel bounded on an inflow side and on an outflow side by a pair of annular regulating lips, the regulating lip on the inflow-side deforming to increase and decrease a cross-section of the flow opening as a function of pressure of water floing through the flow channel the opening diverging along the flow path from the lip on the inlet side and converging along the flow path toward the lip on the outlet side, the throttling insert being symmetrical around a plane between the inflow and outflow sides, normal to the flow channel.

2. An apparatus according to claim 1, wherein the flow channel defined by the throttling insert has an increasing internal diameter leading to the plane from the inflow side and leading to the plane from the outflow side.

3. An apparatus according to claim 2, wherein the flow channel is defined by a curved wall of the insert as viewed in longitudinal section.

4. An apparatus according to claim 2, wherein the flow channel defines opposite linear cones as viewed in longitudinal section.

5. An apparatus according to claim 4, wherein the throttling insert is substantially annular and has on both end faces an annular slot concentric to the flow channel.

6. An apparatus according to claim 5, wherein areas of the throttling insert forming transitions from the annular slots to the flow channel have a cross section in each case substantially corresponding to a wedge with a wedge angle of 35° to 50°.

7. An apparatus according to claim 1, wherein outside surfaces of the regulating lips toward the inlet side and toward the outlet side each define a circumferential surface of a truncated cone.

8. An apparatus according to claim 7, wherein the truncated cone extends into the bottom of the annular slot.

9. An apparatus according to claim 1, wherein a flow-facing side of the regulating lips in each case slopes by approximately 20° to 40° out of a cross-sectional plane counter to a flow direction.

10. An apparatus according to claim 1, further comprising a thrust ring associated with the throttling insert and operable to support the insert on the outflow side.

11. An apparatus according to claim 10, wherein the thrust ring radially supports the throttling insert.

12. An apparatus according to claim 10, wherein the thrust ring has a bearing shoulder profiled to substantially correspond to a groove on the outflow-side of the throttling insert and projects into the groove.

13. An apparatus according to claim 12, wherein the thrust ring and the insert are shaped such that when there is no flow, the bearing shoulder leaves a wedge-like part of the outflow-side regulating lip substantially unsupported.

14. An apparatus according to claim 10, wherein on the outflow-side, the thrust ring has at least one flow guidance member.

15. An apparatus according to claim 14, wherein the flow guidance member is a perforated base plate.

16. An apparatus according to claim 14, wherein the flow guidance member has a through-flow channel widening in steps.

17. An apparatus according to claim 10, wherein the throttling insert and the thrust ring associated therewith form a compact unit, which unit can be inserted into a fitting to limit flow therein.

18. An apparatus for throttling flow in water fittings, comprising:
    a throttling insert made from an elastic material, the insert having a through opening for water flow, the opening having a continuously concave shape and defining two lips at an inlet side and an outlet side thereof, the opening diverging along the flow path from a lip on an inlet side and converging along the flow path toward a lip on an outlet side, the inlet side lip being deformable to restrict the flow opening in response to water pressure.

19. The apparatus of claim 18, further comprising a thrust ring having an annular bearing shoulder supporting a part of the outlet side lip.

* * * * *

UNITED STATES PATENT AND TRADEMARK OFFICE
CERTIFICATE OF CORRECTION

PATENT NO. : 4,667,700

DATED : May 26, 1987

INVENTOR(S) : Guenther Buzzi

It is certified that error appears in the above-identified patent and that said Letters Patent is hereby corrected as shown below:

Column 1, line 41, after "channel" insert --of--.

Column 2, line 18, change "thurst" to --thrust--.

Column 3, line 48, change "thurst" to --thrust--.

Column 3, line 64, change "tip" to --lip--.

Column 4, line 34, change "floing" to --flowing--.

Signed and Sealed this

Third Day of May, 1988

Attest:

DONALD J. QUIGG

*Attesting Officer*  *Commissioner of Patents and Trademarks*